(12) United States Patent
Wahab et al.

(10) Patent No.: US 6,285,313 B1
(45) Date of Patent: Sep. 4, 2001

(54) TCAS TRANSMITTER PHASE TUNING SYSTEM AND METHOD

(75) Inventors: Sami R. Wahab, Melbourne; Constantinos S. Kyriakos, Indian Harbour Beach, both of FL (US); Charles L. Holecek, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/400,572

(22) Filed: Sep. 21, 1999

(51) Int. Cl.[7] .................................................. G01S 7/40
(52) U.S. Cl. ............................... 342/174; 342/165
(58) Field of Search .............................. 342/165, 169, 342/170, 171, 172, 173, 174

(56) References Cited

U.S. PATENT DOCUMENTS

| | | | |
|---|---|---|---|
| 3,697,876 | * 10/1972 | Robbins et al. | 342/47 |
| 4,855,748 | 8/1989 | Brandao et al. | 342/455 |
| 4,899,157 | 2/1990 | Sanford et al. | 342/40 |
| 5,008,844 | 4/1991 | Kyriakos et al. | 364/571.05 |
| 5,122,808 | 6/1992 | Kyriakos | 342/442 |
| 5,387,915 | * 2/1995 | Moussa et al. | 342/40 |
| 5,463,398 | * 10/1995 | Young | 342/46 |
| 5,469,172 | * 11/1995 | Schleder et al. | 342/174 |
| 5,835,059 | * 11/1998 | Nadel et al. | 342/398 |
| 6,094,169 | * 7/2000 | Smith et al. | 342/465 |

* cited by examiner

Primary Examiner—John B. Sotomayor
(74) Attorney, Agent, or Firm—Nathan O. Jensen; Kyle Eppele

(57) ABSTRACT

A TCAS receiver/transmitter which uses an improved calibration scheme for improving the ability of the device to transmit in a narrow directional field where the device uses the transmitter frequency source to generate signals for calibration purposes. The calibration uses a technique of simultaneously transmitting from two antennas and manipulating the phase of the signal through successive settings. The signals are monitored by the remaining two antennas and calibration adjustments are made in response thereto.

20 Claims, 11 Drawing Sheets

TCAS TRANSMITTER PHASE TUNING SYSTEM AND METHOD

CROSS REFERENCE TO RELATED APPLICATIONS

The present invention relates to co-pending application entitled "TCAS Bearing Measurement Receiver Apparatus with Phase Error Compensation Method" by Charles L. Holecek, Constantinos S. Kyriakos and Sami Wahab, which is filed on even date herewith and is incorporated herein by this reference.

BACKGROUND OF THE INVENTION

This invention generally relates to beamsteering antenna systems, and more specifically, it relates to a transmitter system in a Traffic/Alert Collision Avoidance System (TCAS) which is particularly suited for directional interrogation of a target aircraft relative to a protected aircraft and methods of operation of the same.

The TCAS equipment located aboard a protected aircraft periodically transmits interrogation signals which are received by transponders located aboard other aircraft, hereinafter referred to as target aircraft, in the vicinity of the protected aircraft. Either Mode S or Mode C altitude reporting transponders are preferred. In reply to the interrogation signals, the target aircraft's transponder transmits a response signal. The TCAS equipment aboard the protected aircraft determines the range of the target aircraft in accordance with the round trip time between transmission of the interrogation signal and receipt of the response signal, taking into account standard delays within the transponder. In addition, if the target aircraft is equipped with a Mode S transponder, the protected aircraft can identify the target aircraft from a unique address assigned each Mode S equipped aircraft.

Information in the response signal, as well as information derived from the response signal, is used by the TCAS equipment to determine whether there is a threat of collision between the protected aircraft and the target aircraft. The response from each target aircraft is processed individually to determine the degree of threat and then, if necessary, an appropriate resolution advisory (climb or descend) is issued by the TCAS equipment to the pilot of the protected aircraft to minimize the degree of threat.

The current generation of TCAS, generally known as TCAS II, must be capable of providing directional interrogations from both top and bottom mounted antennas for surveillance of mode C target aircraft in densities up to 0.3 aircraft per $nmi^2$. Additionally it has been proposed that the next generation of TCAS, TCAS III, will provide for both horizontal and vertical resolution advisories to provide enhanced positive separation of aircraft. To address increasing densities of aircraft under the TCAS II equipment and the need for enhanced resolution advisory processing speeds and increased horizontal discrimination of intruding aircraft, it is becoming increasingly desirable to provide for enhanced capability of performing directional interrogations of smaller slices of space about the aircraft that may include intruding aircraft. It, therefore, is necessary to maintain proper alignment of the transmitted radiation patterns for TCAS equipment. The directional interrogations allow for focussing the threat calculation algorithms and systems on certain spaces around the protected aircraft. For example, the air space in front of the protected aircraft generally requires more frequent updates than an area behind the aircraft. Directional interrogations essentially limit the location of and number of responses and thereby allowing for quicker processing of transponder responses from the most important air spaces about the aircraft.

TCAS processors transmit interrogations to transponders on the assigned radio frequency channel at 1030 MHz. Because all transponders respond back on the same assigned radio frequency channel at 1090 MHz, it is necessary to employ techniques to segregate transponder responses, in time, such that several responses do not occur at the same time, causing any, or all, responses to be garbled and un-decodable by the TCAS processor.

Ground stations, typically at airports, have been interrogating aircraft transponders for several years. At airport ground stations, segregation of transponder responses is typically accomplished by employing a very large rotating high gain directional antenna with a very narrow beamwidth. Because these large antennas cannot be used on aircraft, other methods had to be employed within the Traffic alert and Collision Avoidance System (TCAS) function employed on aircraft.

On aircraft, typically a small four-element antenna array capable of four directional beams is used. The beam width of this array is relatively wide beam being at least one quadrant. The four directional beams provide some, but not sufficient, segregation in space. For further segregation, a process called whisper/shout is used. Whisper/shout essentially varies TCAS transmitter power level and correspondingly varies TCAS receiver threshold level, to segregate responding transponders in relation to distance from the protected aircraft. A suppression process included within transponders is utilized as a part of this segregation process. Thus, for of each interrogation transmission from a TCAS unit, there is little overlap of responses received back at a TCAS receiver from several transponders in an airspace.

Consequently, there exists a need for improved TCAS transmitter systems for enhancing transmitter phase tuning and further enhancing beamsteering ability for TCAS interrogations.

SUMMARY OF THE INVENTION

It is an object of the present invention to provide for improved phase tuning of TCAS transmitters.

It is a feature of the present invention to include a TCAS system having at least four receivers therein wherein one receiver is coupled to one of at least four antenna elements. Wherein the receiver also includes a calibration oscillator for transmitting a calibration signal at the normal TCAS transmission frequency of 1030 MHz.

It is an advantage of the present invention to provide for improved transmitter phase tuning.

It is another object of the present invention to provide for reduced ambiguity in TCAS receiver systems.

It is another feature of the present invention to utilize a method of transmitter phase tuning which includes transmitter calibration involving simultaneous use of transmitting antenna elements.

It is another advantage of the present invention to have enhanced phase error determination in the presence of phase errors which are introduced by leakage of the transmitted calibration signal inside the receiver/transmitter and before transmission of the calibration signal from the antennas.

Accordingly, the present invention is a TCAS transmitter phase tuning system using a calibration signal transmitted at the normal TCAS interrogation frequency. The present invention is also a TCAS transmitter phase tuning system which utilizes simultaneous transmission of a calibration signal from at least two of at least four antenna elements.

BRIEF DESCRIPTION OF THE DRAWINGS

The invention may be more fully understood from the following description of preferred embodiments of the invention, in conjunction with the appended drawings wherein.

DESCRIPTION OF PREFERRED EMBODIMENTS

Figure 1:
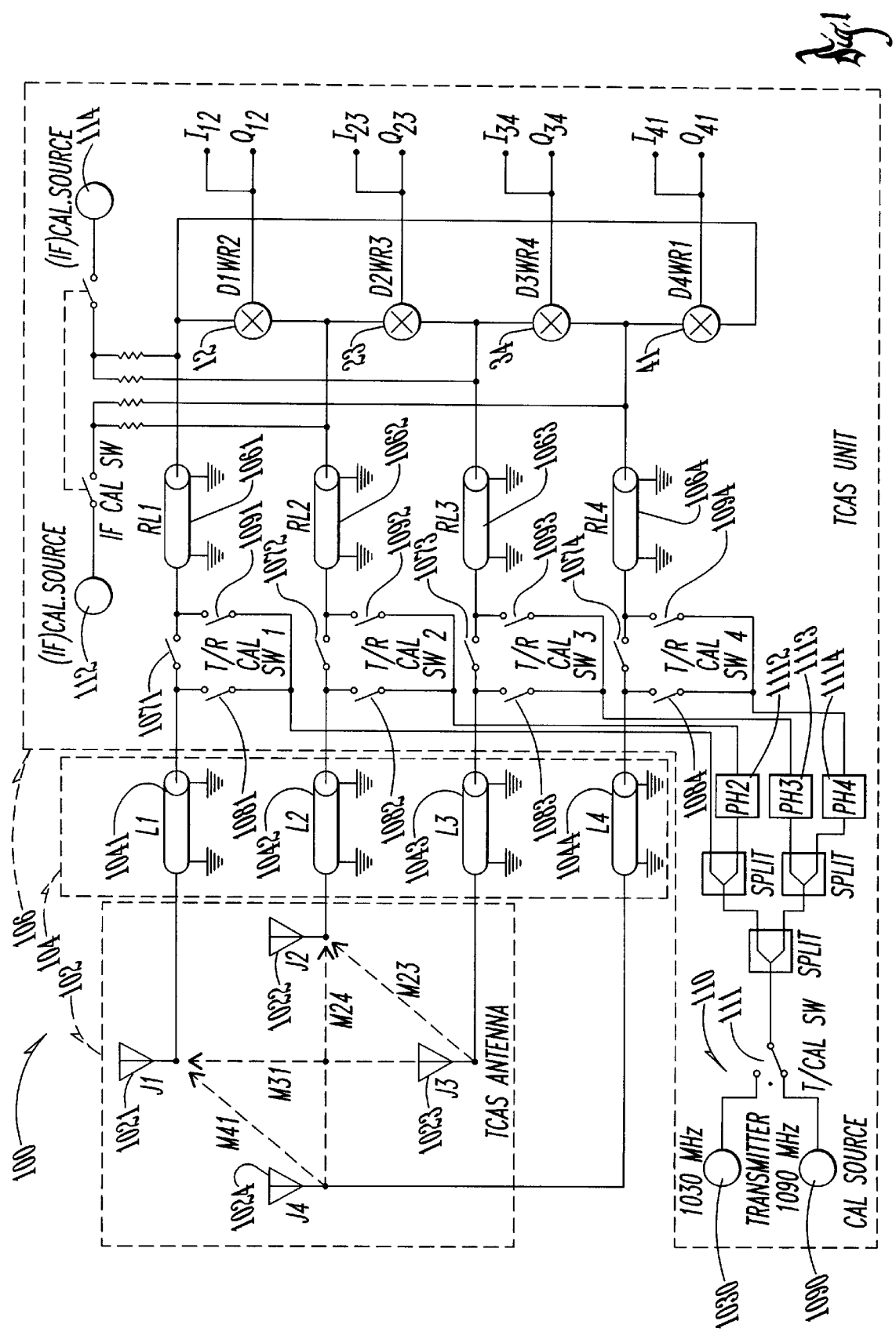
FIG. 1 is a highly simplified block diagram of a receiver apparatus and antenna combination of the present invention.

Now referring to the drawings, wherein like numerals refer to like matter throughout, and more particularly to FIG. 1, there is shown a highly simplified TCAS receiver antenna combination, generally designated 100, having a multi-element antenna array 102 which includes antennas 1021, 1022, 1023, and 1024, which may also be referred to herein and in the drawings as J1, J2, J3, and J4 respectively and antennas 1, 2, 3 and 4 respectively. This information on the TCAS receiver is provided to better facilitate an understanding of how the TCAS transmitter of the present invention inter-relates to the receiver. These antennas may be arranged in a circular pattern with the antennas being separated by an angular distance of 900 geometrically. Antennas 1021, 1022, 1023, and 1024 are designed to receive signals from transponders on board intruding aircraft and to transmit interrogations to transponders. These antennas and others similar to them have been used extensively in the past and are generally well known. The orientation and element spacing of this array of elements can be varied within certain limits. The antenna of elements can be oriented with any angular orientation with the offset referenced to the basic square orientation. The angular offset set from the basic square orientation can be removed in the digital processing. Increasing the element spacing will increase the accuracy with which the bearing can be estimated. But increasing the element spacing creates ambiguities that must be removed to obtain proper calculation of the bearing. Typically, the element spacing will be less than 180 electrical degrees in space between adjacent elements at the operating frequencies of 1030 MHz or 1090 MHz.

Also shown in FIG. 1 is a TCAS bearing receiver system generally designated 106 having receivers 1061, 1062, 1063, and 1064 disposed therein. Disposed between antenna 102 and receiver system 106 is a plurality of connection lines 104. Connection lines 104 include individual connecting lines 1041, 1042, 1043, and 1044, which respectively connect the antenna/receiver pairs 1021 and 1061, 1022 and 1062, 1023 and 1063, and 1024 and 1064. Connecting lines 104 should be understood to include all transmission paths between the antenna 102 and the receiver 106 which would include connecting cables, their associated connectors, and signal paths on any circuit cards associated with the system 100 which are disposed between antenna 102 and receiver 106.

Receiver 106 includes radio frequencies source 110. Source 110 may be used to calibrate the phase errors in the system 100. Radio frequency source 110 includes transmitter source 1030 and receiver calibration source 1090, which through switch 111 are selectively coupled with antennas 1021, 1022, 1023, and 1024 through switches 1081, 1082, 1083, and 1084 respectively. For calibration of cables and other phase delays in the transmit mode, the transmit source 1030 is selected and the transmitter functions the same as it would in the normal transmit mode. Phase shifters 1112, 1113, and 1114 are disposed between the radio frequency source 110 and antennas 1022, 1023, and 1024 respectively and receivers 1062, 1063, and 1064 respectively. Receivers 1061, 1062, 1063, and 1064 are selectively coupled to antennas 1021, 1022, 1023, and 1024 respectively. Receivers 1061, 1062, 1063, and 1064 may be any type of known receiver architecture which is capable of receiving and demodulating both I and Q components of any received signal. Receiver 106 includes intermediate frequency (IF) calibration sources 112 and 114, which may be local oscillators operating at predetermined frequencies. Disposed between receiver 1061 and 1062 is phase detector 12. Disposed between receiver 1062 and 1063 is phase detector 23. Disposed between receiver 1063 and 1064 is phase detector 34. Disposed between receiver 1064 and 1061 is phase detector 41. Phase detectors 12, 23, 34, and 41 are used to measure the relative phase between the outputs of the receivers 1061, 1062, 1063, and 1064 for both their I and Q components. Phase detectors 12, 23, 34 and 41 may be accomplished using various different types of devices: typical circuits that might be used as phase detectors include double balanced diode mixers and Gilbert cell integrated circuit mixers. Phase detector 12 provides an $I_{12}$ output and a $Q_{12}$ output. Similarly, phase detector 23 provides an $I_{23}$ output and a $Q_{23}$ output. Phase detectors 34 and 41 provide $I_{34}$ and $Q_{34}$ and $I_{41}$ and $Q_{41}$ outputs respectively. Frequency conversion to the typical IF frequency of 60 MHz, while present, is not shown in simplified diagram FIG. 1.

Figure 2:
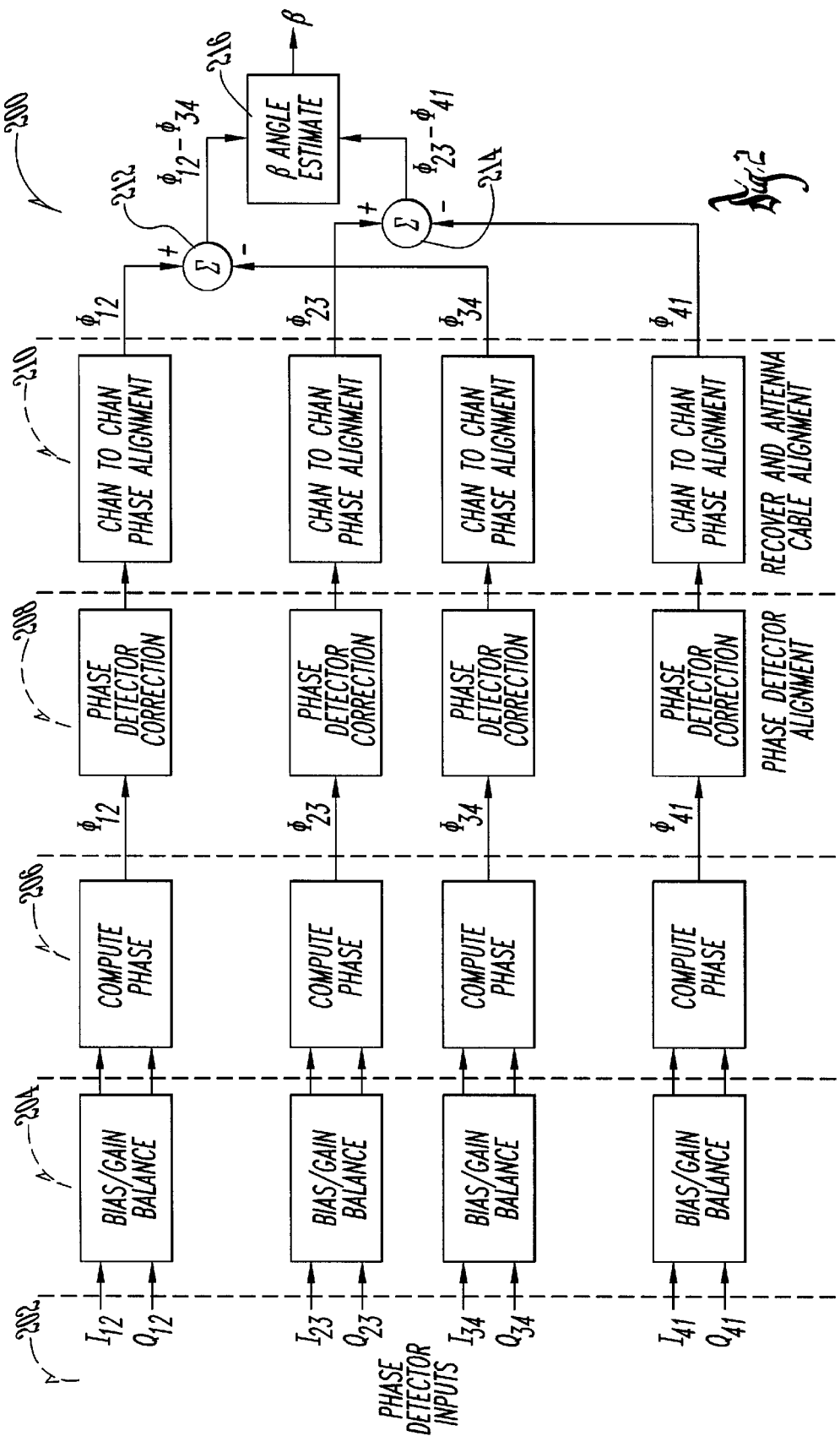
FIG. 2 is a signal flow diagram, of the method of the present invention, used to calculate bearing of an intruding aircraft.

Now referring to FIGS. 1 and 2, there is pictorially shown a signal flow diagram 200 of the process of bearing determination for the present invention which shows phase detector inputs 202, which are output from phase detectors 12, 23, 34, and 41 of FIG. 1. The signals 202 are first processed through the step 204 which makes corrections for bias and gain balancing. This first step 204 may be preceded by an analog to digital conversion. Once step 204 is completed, the following step 206 computes the raw phase difference between the compared receiver adjacent channels. This computed raw phase difference includes phase errors therein which could come from several sources, including errors in the phase detectors themselves and errors relating to transmission path differences between the channels also referred to at times as phase alignment errors or receiver and antenna cable alignment errors. Computed raw phase difference is then processed through step 208, which is designed to correct for phase errors resulting from characteristics of the phase detectors. Then in step 210, errors associated with transmission path link differences between the compared transmission paths are corrected. A corrected phase signal is then output for each of the four receiver comparisons. The outputs of the various steps 210 are combined through summer 212 and 214 and ultimately an angle of arrival of the incident transmission from an intruding aircraft β is determined through step 216. β is the relative bearing to the intruding aircraft.

The detector calibration mode, including bias offset, gain balance, and detector linearity correction in blocks 204, 206 and 208 must be repeated for transmit mode calibration. The calibration data obtained must be stored separately from the calibration information obtained for receive mode calibration.

Now referring to FIGS. 3, 4, 5, 6, 7, and 8, which in combination provide a simplified top level diagram of a TCAS transmitter/receiver, of the present invention, which provides some of the same matter as FIGS. 1 and 2, but also provides additional and more detailed information relating to the transmitter, transmitter calibration and transmitter phase tuning aspects of the present invention. FIGS. 3, 4, 5, 6, 7, and 8 are coupled through alphabetically labeled connecting lines having common labels.

Figure 3:
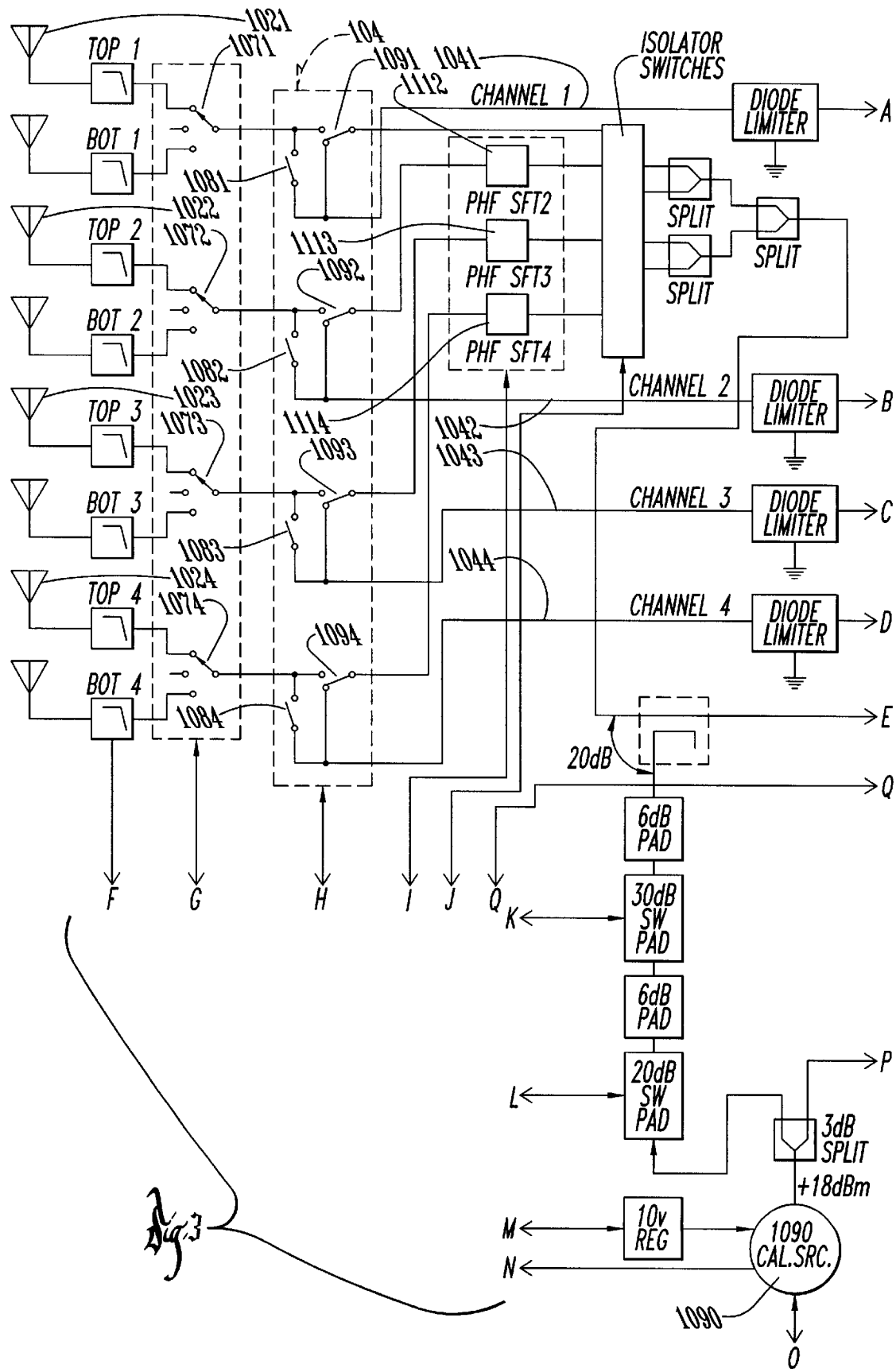
FIG. 3 is a simplified top level diagram of an embodiment of the present invention showing both top and bottom antenna elements and other beamsteering functions.
Figure 5:
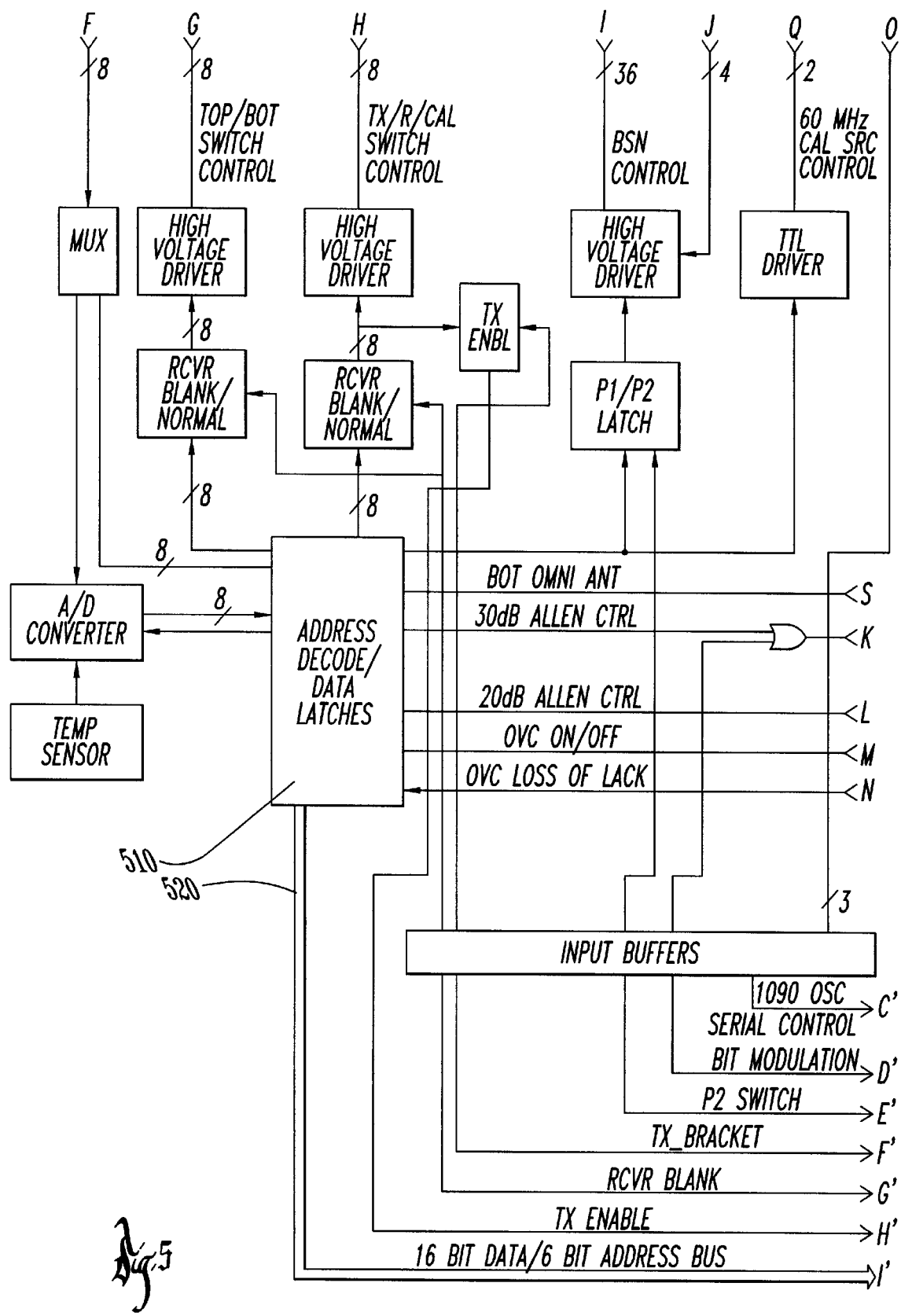
FIG. 5 is a simplified top level diagram of a beamsteering network control board of the present invention.

More particularly referring to FIG. 3, there is shown a beamsteering network of the present invention, which includes, among other things, control signal inputs on lines F, G, H, I, J, Q and O from beamsteering network control board of FIG. 5. Also shown is transmitter output line E and receiver 1090 LO source line P. The 1090 LO source is provided through the 1030/1090 LO switch in the transmitter of FIG. 6. The 1090 LO source output is applied to the receiver LO port to set the receiver up for reception on 1030 MHz during the transmitter calibration mode.

Figure 4:
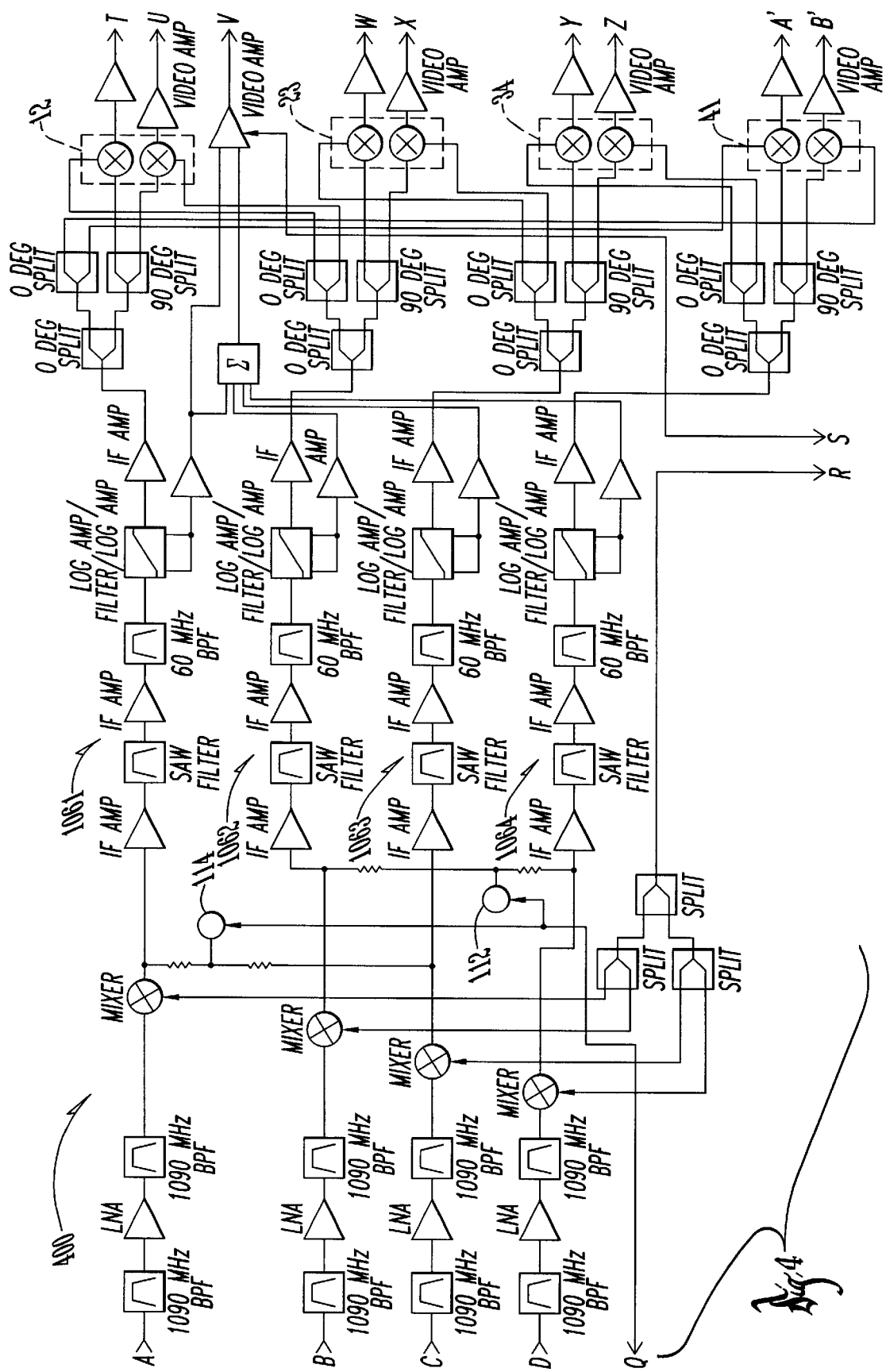
FIG. 4 is a simplified top level diagram of an embodiment of an analog receiver of the present invention.

Now referring to FIG. 4, there is shown a receiver of the present invention, which provides additional detail beyond that shown in FIG. 1. More particularly, it shows separate I and Q phase detectors for each phase detector 12, 23, 34, and 41.

Figure 8:
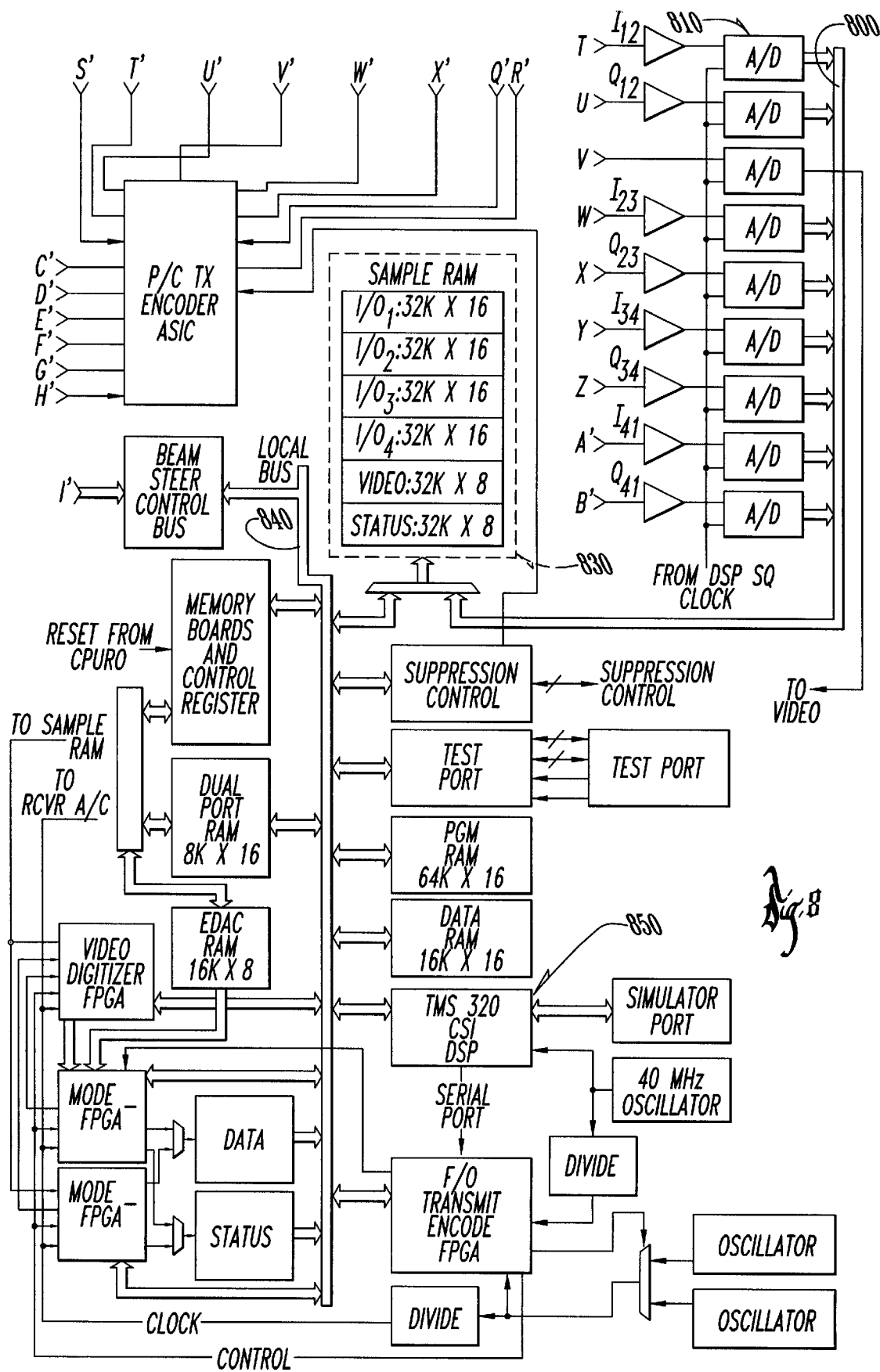
FIG. 8 is a simplified top level diagram of the digital signal processor of the present invention.

Now referring to FIG. 5, there is shown a beamsteering network control circuit, including a programmable logic circuit device 510 which is used to perform address decoding and data latch operations in response to signals on beamsteering data bus 520 originating from the signal processing 800 of FIG. 8.

Figure 6:
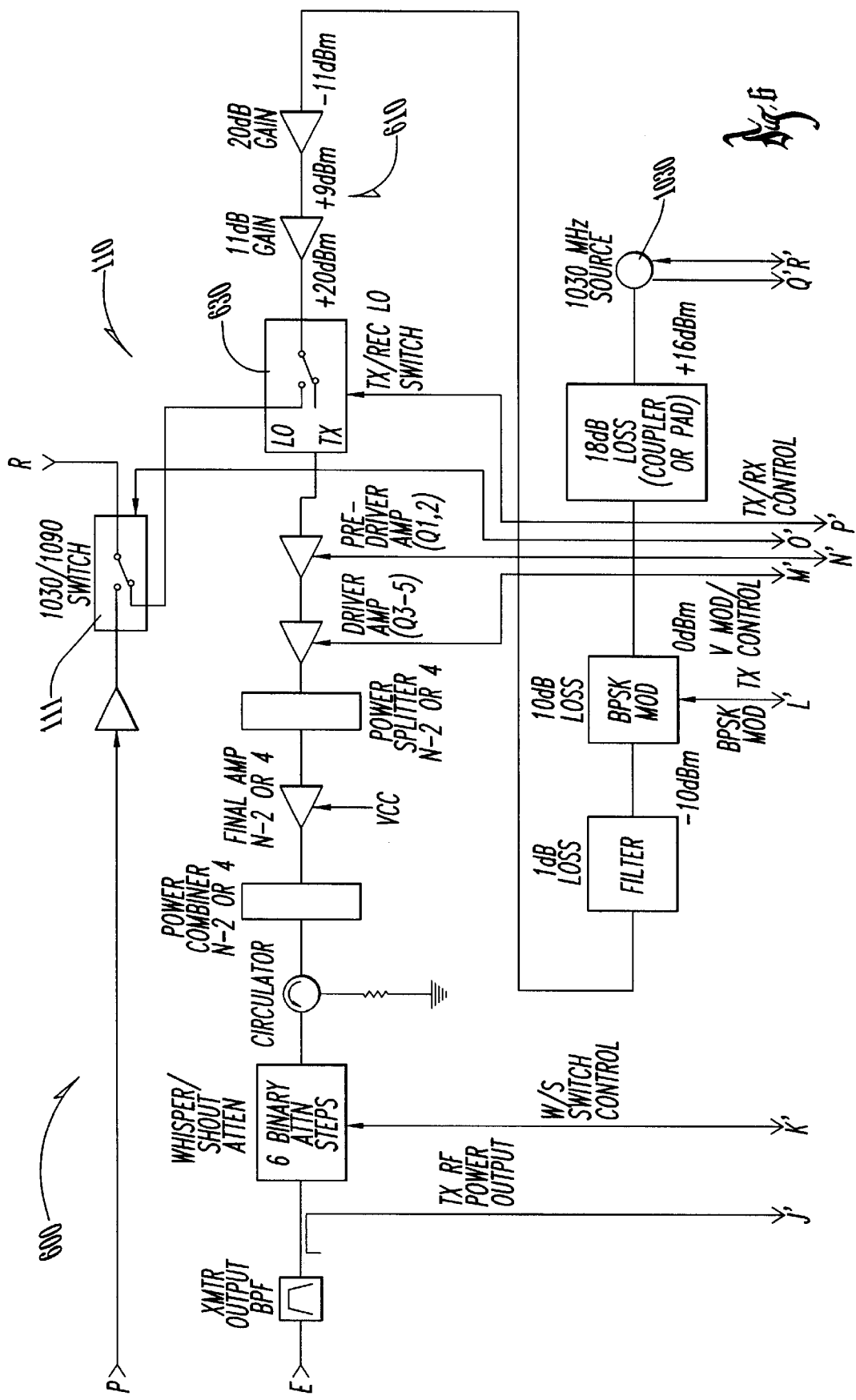
FIG. 6 is a simplified top level diagram of a transmitter of the present invention which includes a 1030 MHz source.

Now referring to FIG. 6, there is shown a transmitter, having a transmitter signal source 1030 therein which outputs a signal at 1030 MHz. Also shown in a transmitter 1030 power amplifier, which is used to amplify the source 1030 for transmission by antenna elements 1021–1024. Source 1030 is selectively coupled to receiver through switches 111 and 630.

Figure 7:
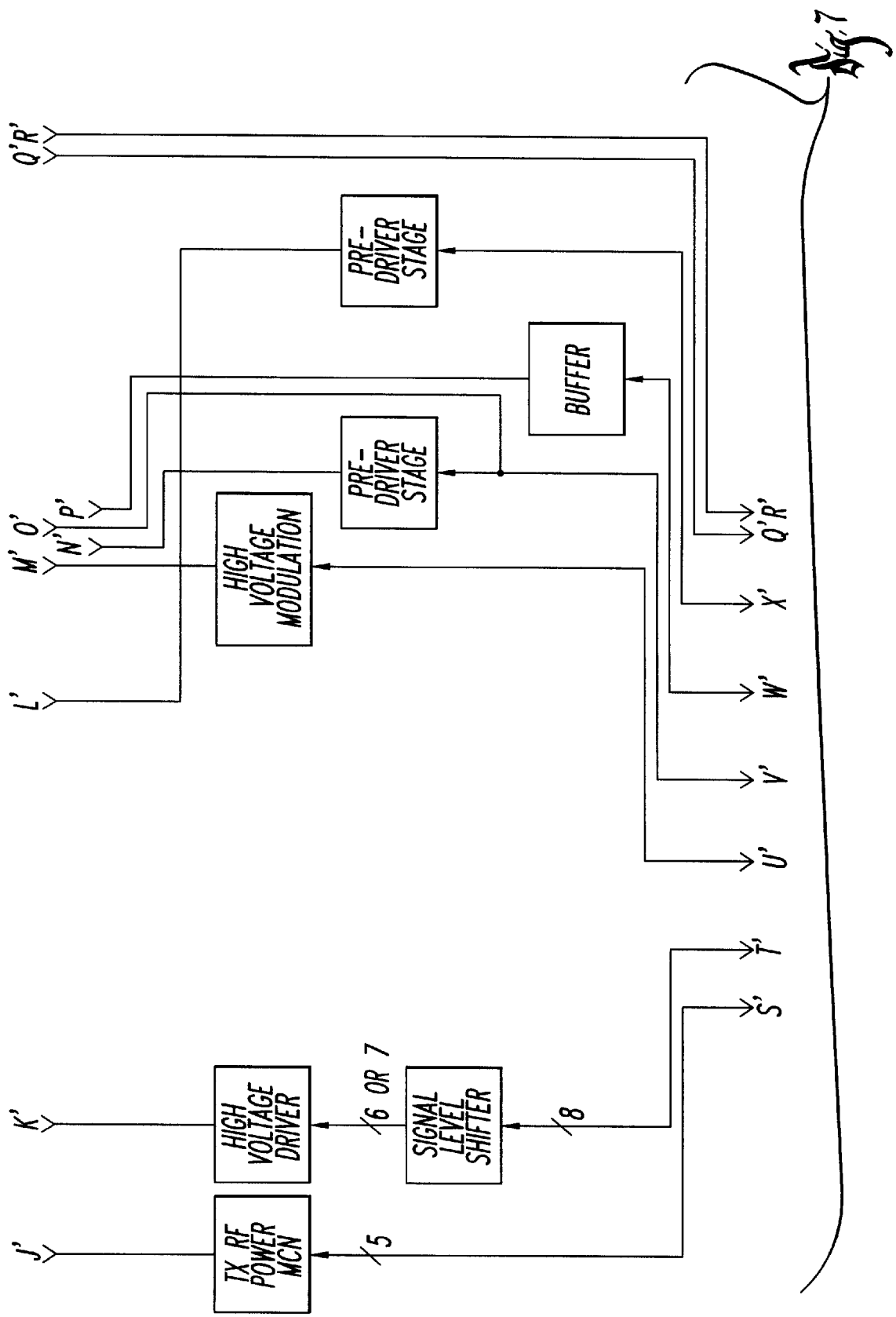
FIG. 7 is a simplified top level diagram of a transmitter modulator of the present invention.

Now referring to FIG. 7, there is shown a modulator, which provides signals involved in controlling and modulating the transmitter resulting in the transmitter output at line E.

Now referring to FIG. 8, there is shown a signal processor, which includes various analog to digital converters 810, which provide through bus 800, a digital output of the I and Q signals from each phase detector 12, 23, 34, and 41, to memory 830. Memory 830 is coupled, via local bus 840, to digital signal processor 850, which may be an assortment of discrete programmable logic devices and memories or an ASIC or other microprocessor capable of providing similar functions.

Figure 9:
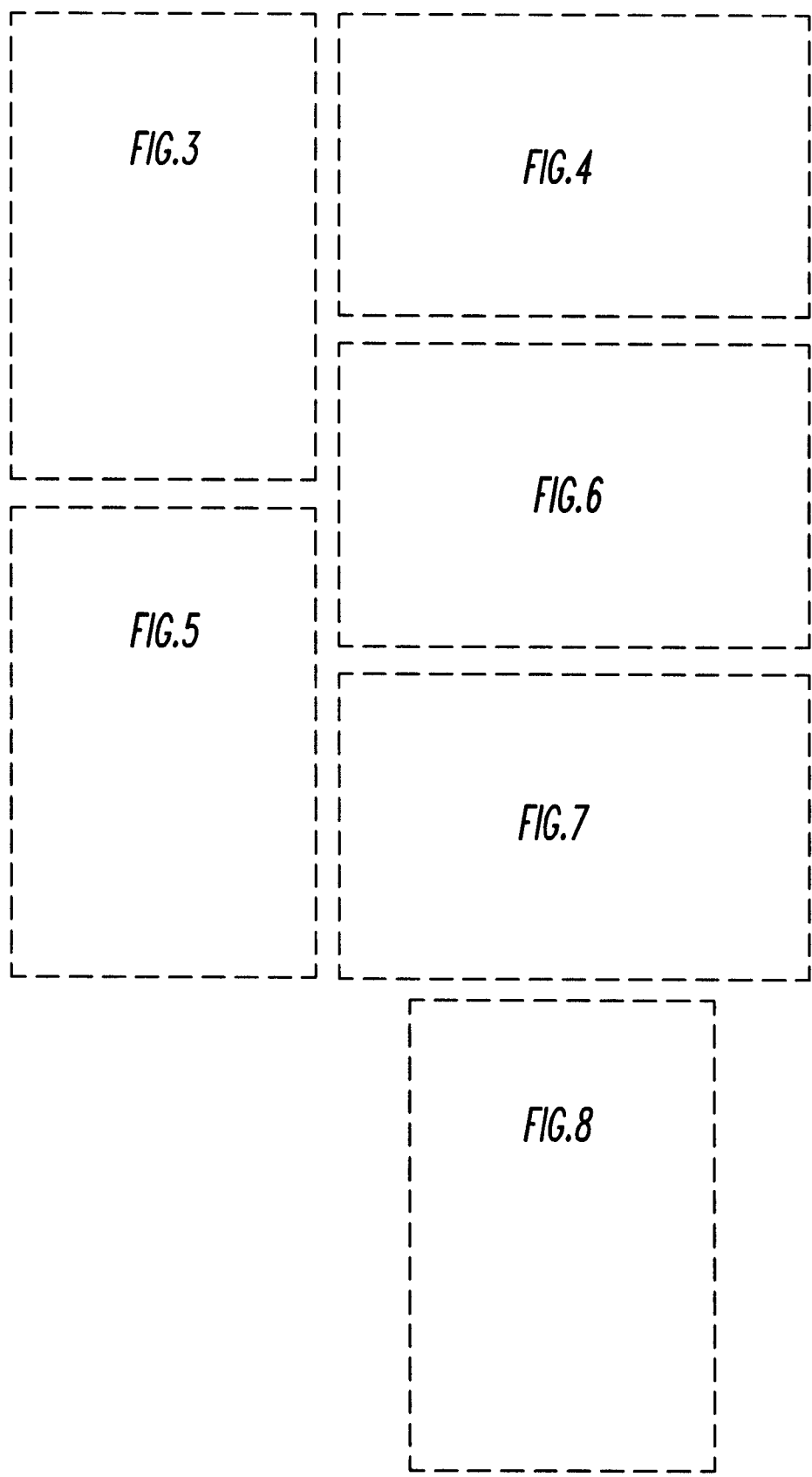
FIG. 9 shows a combination of FIGS. 3–8 to display how the various functions and segments might be logically coupled to each other.

Now referring to FIG. 9, there is shown a combination of FIGS. 3–8, provided to aid in understanding a possible interconnection arrangement among the figures and their respective structure.

The operation of the above-described apparatus can be better understood by referring to the following description of a method of the present invention.

The present invention uses a different methodology to perform transmitter phase tuning than has been used in the past. The new method solves pre-existing problems measuring phase at the same frequency for which the equipment is designed to transmit on, 1030 MHz.

When transmitter phase tuning is performed, the source 1090, a 1090 MHz BITE OSC becomes the receivers' local oscillator (LO) and the source 1030, a 1030 MHz OSC provides the test signal source through the complete transmitter and whisper/shout attenuator. The whisper/shout attenuator will likely be set at the maximum attenuation on the order of 30 db to limit the signal level that will be supplied to the receiver inputs. Injecting the receiver inputs with 1030 Mhz RF energy may be done at a sufficient level to compensate for attenuation that occurs on the skirts of the 1090 MHz band pass filters at the receiver inputs. These are the band pass filters labeled 1090 MHz BPF. Note that the IF remains at 60 MHz. This mode of operation may be referred to herein as "XmtCalMode".

Figure 10:
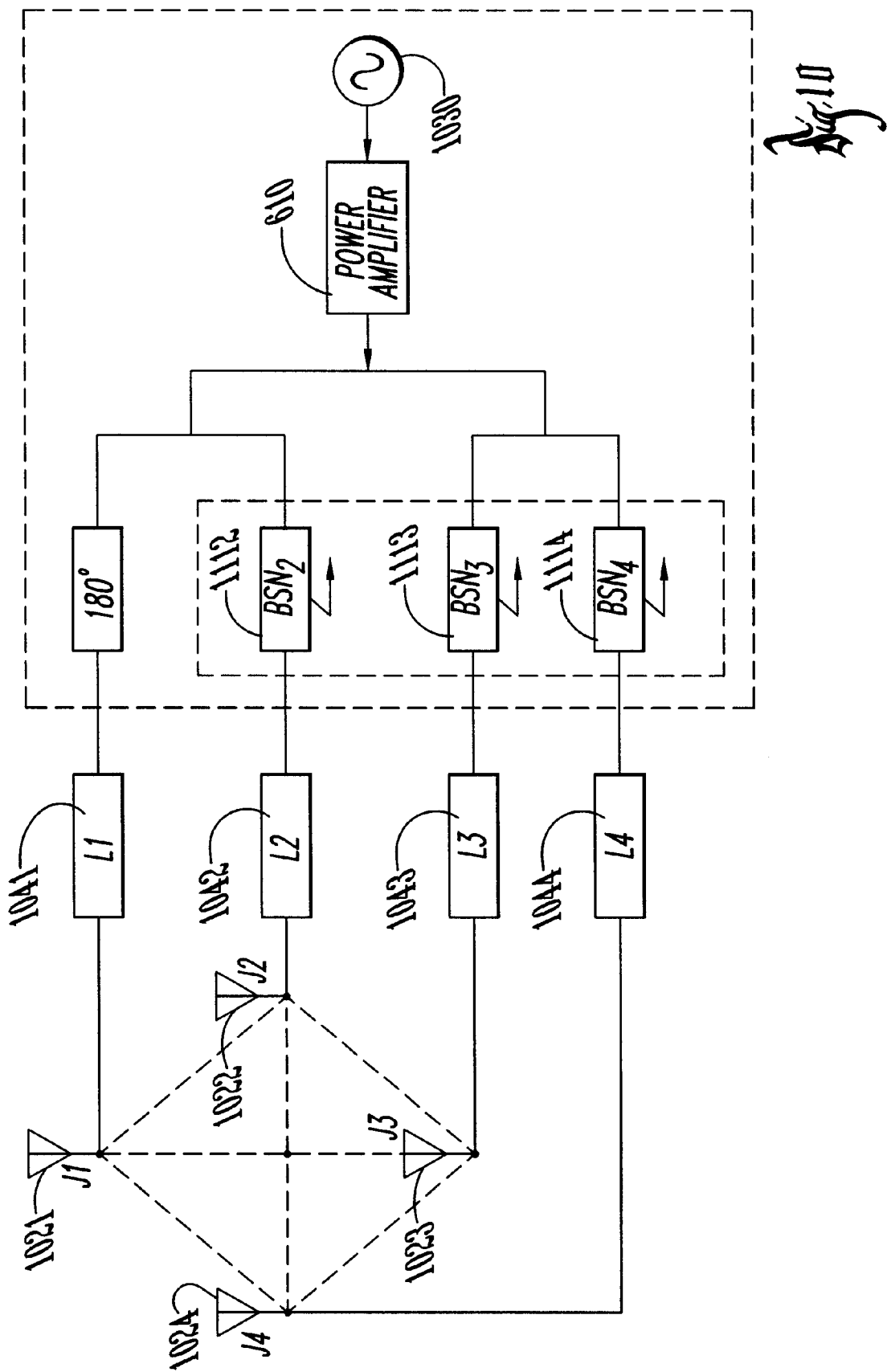
FIG. 10 is a simplified schematic diagram of portions of the transmitter of FIGS. 3–8 which highlights portions of the receiver/transmitter which have particular significance in transmitter phase tuning and calibration.

Now referring specifically to FIG. 10, phase tuning is achieved when the settings of phase shifters 1112, 1113, and 1114, also respectively referred to herein as $BSN_2$, $BSN_3$, and $BSN_4$, produce phase matched transmit signals at the antenna elements. Phase shifters 1112, 1113, and 1114 are set to obtain phase match at antenna elements 1021, 1022, 1023 and 1024, which may be referred to as 1, 2, 3, and 4 respectively and/or J1, J2, J3 and J4, respectively. These phase shifter settings are computed during XmtCalMode and used later during normal operating mode. This provides improved beamsteering of the transmit radiation patterns, which permits more precise control of sectors of airspace being interrogated, such that the phases at 1022, 1023, and 1024 match with the phase at 1021 or are later commanded to specific phase differences as desired.

There are several steps required to complete transmitter phase tuning:

Step 1—Determine phase detector centers
Step 2—Match 1024 phase to 1021 phase
Step 3—Match 1022 phase to 1021 phase
Step 4—Match 1023 phase to 1022 phase
Step 5—Match 1023 phase to 1024 phase
Step 6—Average 1023 phase results from Steps 4 and 5

In Step 1, phase detector centers are computed at 1030 MHz and may use the same procedure as for receiver phase alignment as described in the cross-referenced and copending patent application, except that phase measurements rotate in the opposite direction. (This is because the RF signal and LO frequencies are switched).

When phase detector centers are computed, errors caused by signal leakage are compensated for by rotating the BSN phase in the transmit signal path and averaging the measured phases. This is effective because the leakage path occurs before the RF signal is radiated across the antenna. Rotating the transmit phase does not affect the measured phase difference, $M_{12}$, but affects the phase error introduced by signal leakage. Rotating phase shifter 1114, BSN4, helps cancel errors due to signal leakage.

Figure 11:
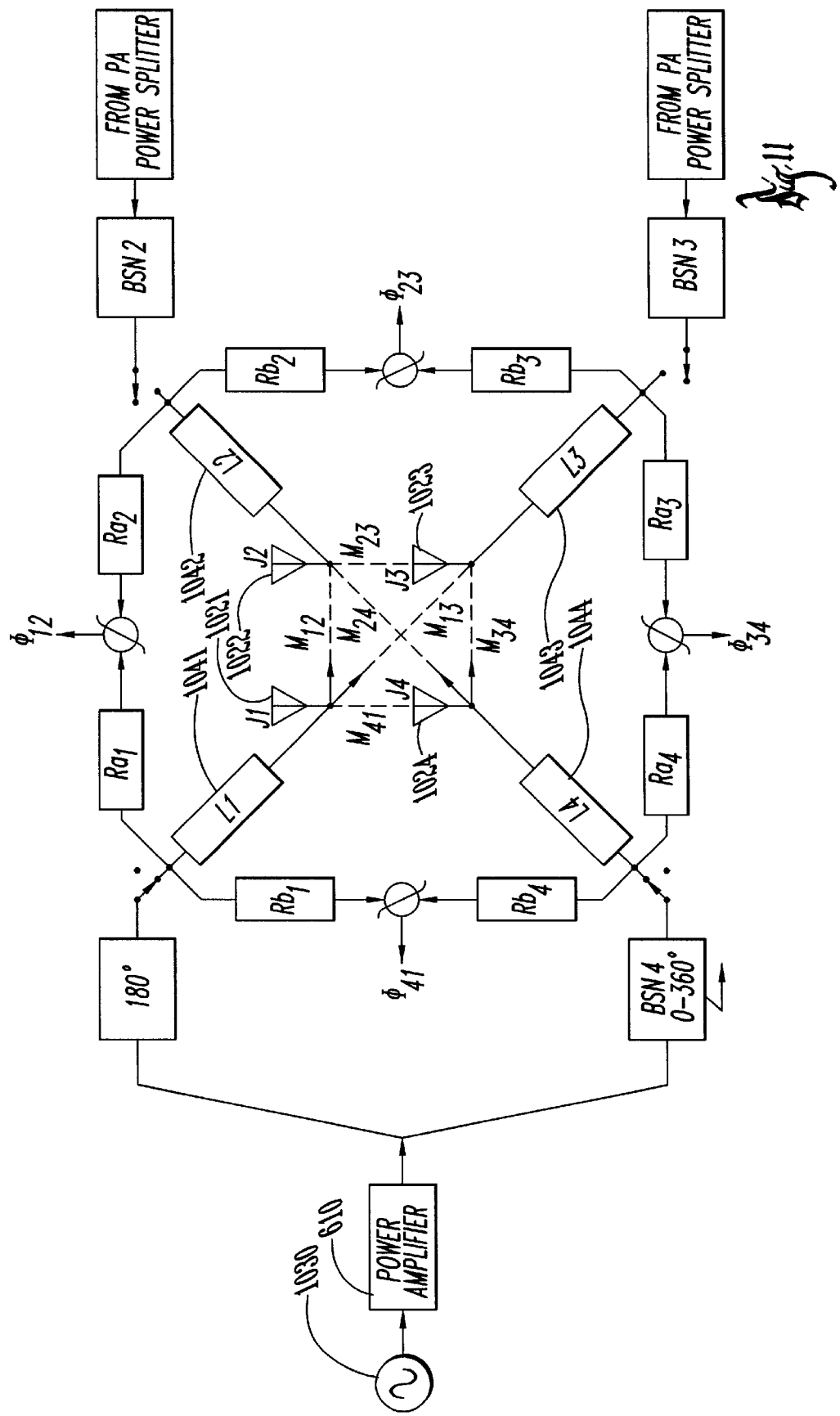
FIG. 11 is a simplified schematic diagram used to depict the simultaneous transmission from two antenna elements and reception on the other two elements for calibration purposes.

Now referring to FIG. 11, in Step 2, a test signal is transmitted from adjacent antenna elements 1024 and 1021 simultaneously, and received on adjacent elements 1022 and 1023, while rotating the 1024 element phase using BSN4. While reception is at antenna elements 1022 and 1023, the references for phase detectors $\Phi_{12}$ and $\Phi_{34}$ are obtained from the transmitter signal used during this calibration process. The references for phase detector $\Phi_2$ are from transmission through the 180 phase shift in channel 1 to the receiver in channel 1. The references for phase detector $\Phi_{34}$ are from transmission through the phase BSN4 shifter in channel 4 to the receiver in channel 4. Phase measurements $\Phi_{12}$, $\Phi_{23}$ and $\Phi_{34}$ are made across the antenna for each BSN4 phase setting. L1 represents the phase delays in the path connecting the antenna element J1 to the receiver port for channel 1. Ra represents the receiver phase delay in the path connecting the receiver port for channel 1 to one side of $\Phi_{12}$ phase detector. This same labeling convention is used for the other similar situationed blocks. $M_{12}$ represents the phase delay of the mutual coupling between the antenna elements J1 and J2. Actually what is of interest is the phase of mutual coupling. That is the phase shift or phase delay or time delay from one element to another of a signal radiated from one element to another. The measured phases are combined in such a way that the cross coupling errors introduced on $M_{23}$, for example, cancel and the resultant phase response is a linear curve. The linearized resultant phase is finally compared with the phase detector center of $M_{23}$ to determine the value of BSN4 which phase matches elements 1024 and 1021 elements, $$\hat{\Phi}_{23} = \Phi_{23} + (\Phi_{12} - \overline{\Phi_{12}}) + (\Phi_{34} - \overline{\Phi_{34}})$$

where, $\Phi_{23}$ is the measured phase at 1022–1023 phase detector $\Phi_{12}$ is the measured phase at 1021–1022 phase detector $\Phi_{34}$ is the measured phase at 1023–1024 phase detector $\Phi_{12}$ with bar is the mean phase of $\Phi_{12}$ $\Phi_{34}$ with bar is the mean phase of $\Phi_{34}$ $\Phi_{23}$ with hat is the corrected phase response at 1022–1023 phase detectors.

Phase detectors $\Phi_{12}$, $\Phi_{23}$ and $\Phi_{34}$ are measured for all phase settings of BSN4.

The other three configurations are similar. It should be understood that switching and connections are available to feed any pair of adjacent antenna elements with the 1030 MHz source and PA 610.

It is now a simple matter to determine the BSN4 phase which provides phase match to antenna elements 1024 and 1021. The linearized $\Phi_{23}$ phase is compared with the phase detector center. When the two curves are equal, the 1024 and 1021 antenna element phases are matched.

In Step 3, a test signal is transmitted from adjacent antenna elements 1022 and 1021 simultaneously, and received on adjacent elements 1023 and 1024, while rotating the 1022 element phase by using BSN2. Phase measurements $\Phi_{23}$, $\Phi_{34}$ and $\Phi_{41}$ are made for each BSN2 phase setting. The procedure to match the phase at elements 1022 and 1021 is the same as that described in Step 2 except for the differences in the transmit and receive ports.

Linearized phase response at $M_{34}$ is:

$$\hat{\Phi}_{34} = \Phi_{34} + (\Phi_{23} - \overline{\Phi_{23}}) + (\Phi_{41} - \overline{\Phi_{41}})$$

In Step 4, a test signal is transmitted from adjacent antenna elements 1023 and 1022 simultaneously, and receiving on adjacent elements 1021 and 1024, while rotating the 1023 element phase by using BSN3. Phase measurements $\Phi_{12}$, $\Phi_{23}$ and $\Phi_{41}$ are made for each BSN3 phase setting. The procedure to match the phase at elements 1023 and 1024 is the same as that described in Step 2 except for the differences in the transmit and receive ports.

Linearized phase response at $M_{41}$, $$\hat{\Phi}_{41} = \Phi_{41} + (\Phi_{12} - \overline{\Phi_{12}}) + (\Phi_{34} - \overline{\Phi_{34}})$$

In Step 5, a test signal is transmitted from adjacent antenna elements 1023 and 1024 simultaneously and receiving on adjacent elements 1022 and 1021, while rotating the 1023 element phase by using BSN3. Phase measurements are made across the antenna for each BSN3 phase setting. The procedure to phase match 1023–1024 elements is the same algorithm as described in Step 2 except for the differences in the transmit and receive ports.

Linearized phase response at $\Phi_{12}$, $$\hat{\Phi}_{12} = \Phi_{12} + (\Phi_{41} - \overline{\Phi_{41}}) + (\Phi_{23} - \overline{\Phi_{23}})$$

In Step 6, measurements from aligning 1023 to 1022 (Step 4) and 1023 to 1024 (Step 5) are averaged together to provide the best estimate for BSN3 phase match.

With the phases properly matched, improved transmitter beamsteering and, therefore, improved directional interrogations can be accomplished.

Throughout this description, the system has been described as a TCAS system; however, the invention is equally applicable to any system which uses an interrogation which benefits from a precisely tunable transmitter. The use of TCAS herein is as a convenient example to convey a representative system.

It is thought that the method and apparatus of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described being a preferred or exemplary embodiment thereof.

We claim:

1. A transmitter on board an aircraft for making directionally targeted transmissions to other aircraft, comprising:
   at least four antenna elements coupled to at least one transmission source operating at a predetermined interrogation frequency; and
   a transmitter calibration signal source operating at said predetermined interrogation frequency for providing calibration signals used in controlling phase relationship between interrogation signals radiating from said at least four antennas.

2. A transmitter of claim 1 wherein said predetermined interrogation frequency is 1030 MHz.

3. A transmitter of claim 1 further comprising:
   at least four receivers coupled to said at least four antenna elements, so that each of said at least four antenna elements is coupled to one of said four receivers.

4. A transmitter of claim 3 wherein at least two of said at least four receivers receive calibration signals from said Transmitter Calibration Signal Source.

5. A transmitter of claim 1 wherein said calibration signal is simultaneously transmitted on at least two of said at least four antenna elements.

6. A transmitter of claim 5 further comprising:
at least four receivers coupled to said at least four antenna elements, so that each of said at least four antenna elements is coupled to one of said four receivers.

7. A transmitter of claim 6 wherein at least two of said at least four receivers receive calibration signals from said Transmitter Calibration Signal Source.

8. A method of calibrating a transmitter having at least four antenna elements in an array; the method comprising the steps of:
providing an array of four antenna elements;
providing a first test signal simultaneously across two adjacent antenna elements of said array;
rotating a phase characteristic of one of said two adjacent antenna elements, through at least two phase settings; and measuring a phase characteristic of a signal received at each of a remaining two antenna elements of said array.

9. A method of claim 8 further comprising the steps of:
determining phase detector centers for phase detectors measuring phase difference between said antenna elements.

10. A method of claim 8 further comprising the steps of:
terminating said first test signal and providing a second test signal simultaneously across another two adjacent antenna elements of said array.

11. A directional transmitter/antenna assembly comprising:
an array of four or more antenna elements disposed around a periphery of a predetermined area for receiving responses from intruding aircraft and for radiating interrogations at a first predetermined frequency;
a plurality of receivers for processing signals received by said antenna elements; and
a transmission calibration source operating at said first predetermined frequency used for generating a calibration signal which is radiated by one of said four or more antenna elements and thereafter received by a first and second other of said four or more antenna elements.

12. An assembly cf claim 11 wherein said transmitter calibration source provides said calibration signal simultaneously for transmitting by two of said four antenna elements.

13. A TCAS transmitter comprising:
first means for radiating electromagnetic energy at a predetermined frequency and with a first predetermined phase characteristic;
second means for radiating electromagnetic energy at a predetermined frequency and with a second predetermined phase characteristic;
third means for radiating electromagnetic energy at a predetermined frequency and with a third predetermined phase characteristic;
fourth means for radiating electromagnetic energy at a predetermined frequency and with a fourth predetermined phase characteristic;
means for simultaneous radiating electromagnetic energy from said first means radiating and said fourth means for radiating;
means for rotating said fourth predetermined phase characteristic through at least two phase settings and measuring a phase characteristic of a signal received by said second and third means for radiating.

14. A TCAS transmitter of claim 13 further comprising:
means for determining measuring phase difference between said second and third means for radiating.

15. A TCAS transmitter of claim 14 further comprising:
means for determining a center point in an operating range for said means for measuring phase difference.

16. A TCAS transmitter of claim 13 further including means for terminating radiation from said first means for radiating and commencing radiation from said second means for radiating.

17. A TCAS transmitter of claim 13 wherein said means for rotating said fourth predetermined phase characteristic is a beamsteering network.

18. A TCAS transmitter of claim 13 wherein said first means for radiating;
said second means for radiating;
said third means for radiating; and
said fourth means for radiating are arranged in a diamond shaped pattern.

19. A TCAS transmitter of claim 18 wherein said means for rotating is a beamsteering network.

20. A TCAS transmitter of claim 19 further including means for measuring a phase difference between said third means for radiating and said fourth means for radiating.

* * * * *